United States Patent Office 3,519,655
Patented July 7, 1970

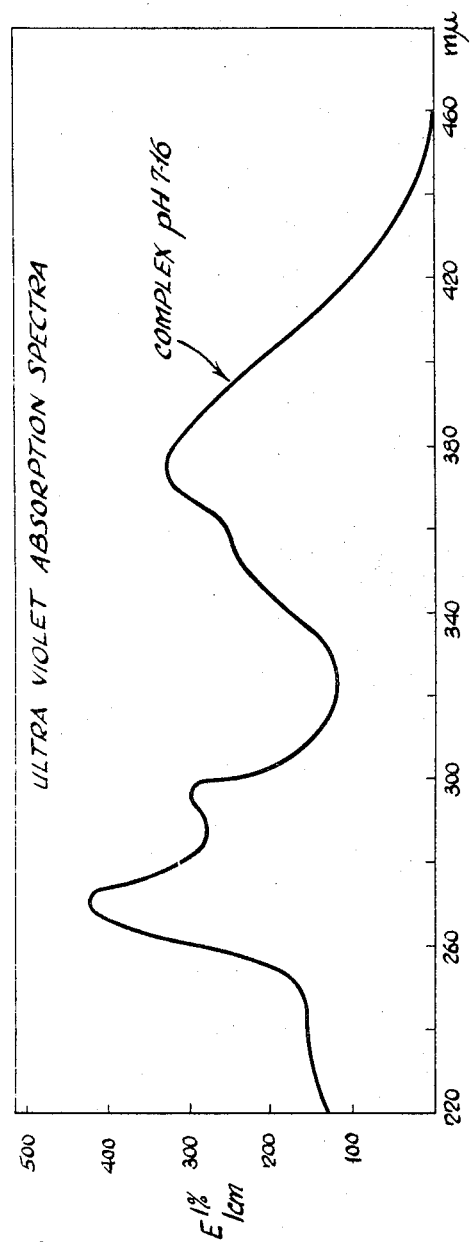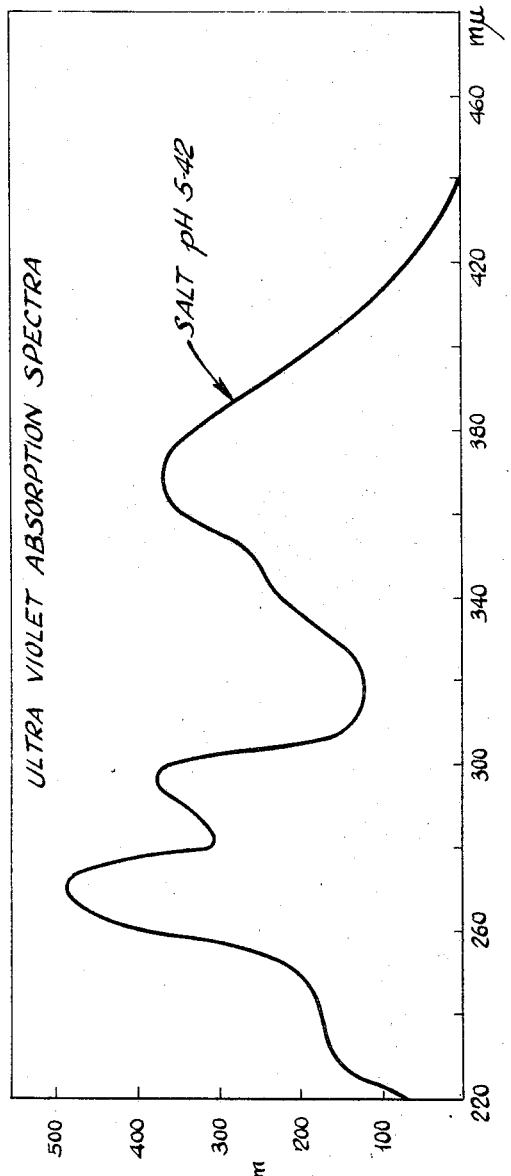

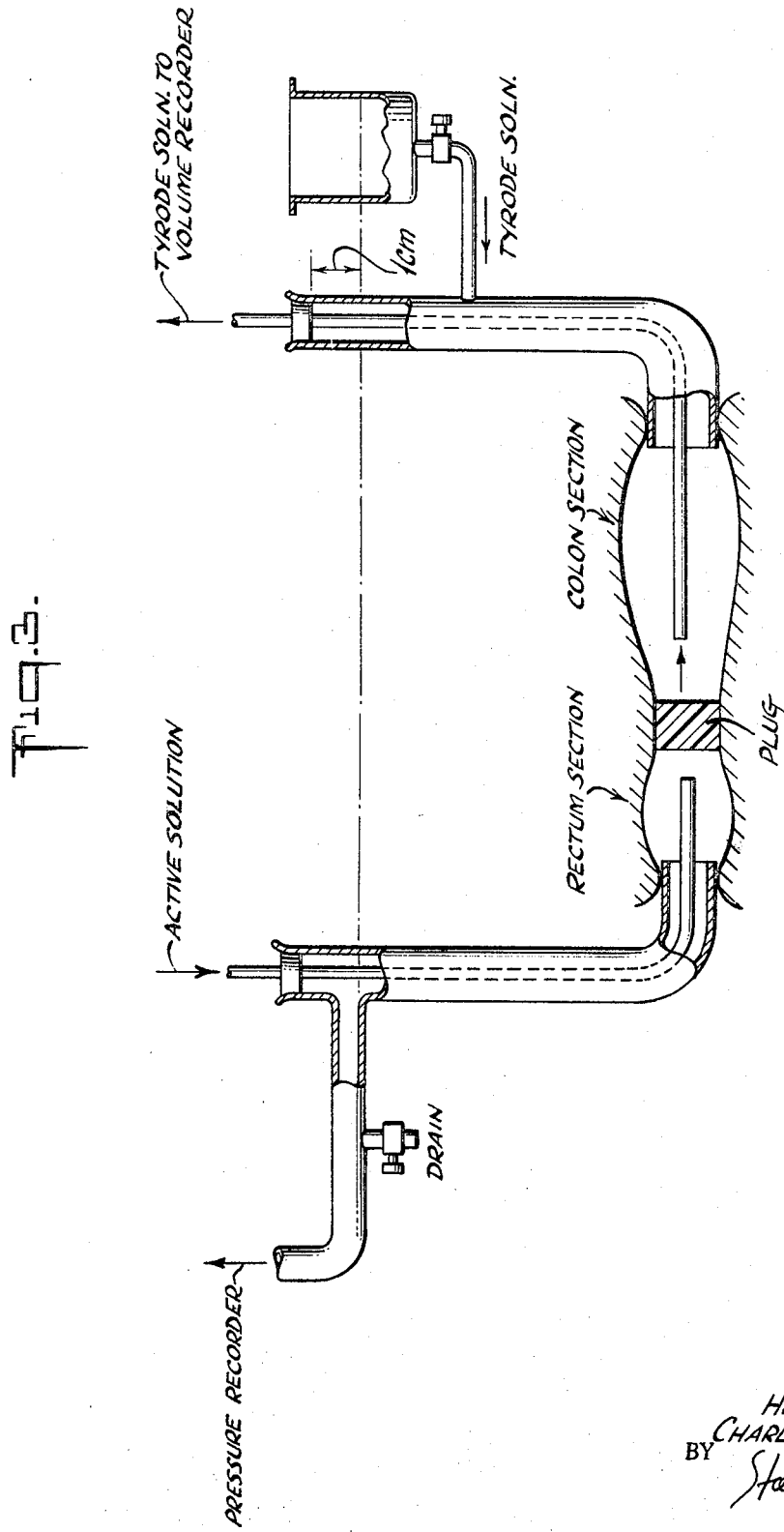

3,519,655
LITHIUM RHEINANTHRONE AND LITHIUM RHEINANTHRONE COMPLEX SALT
Herbert Alan Ryan, Bedford Park, London, and Charles Aubrey Friedmann, Church Row, London, England, assignors to Westminster Laboratories Limited, London, England, a corporation of Great Britain
Filed May 24, 1963, Ser. No. 282,963
Int. Cl. C07c 65/20
U.S. Cl. 260—351      2 Claims

ABSTRACT OF THE DISCLOSURE

Lithium salts of rheinanthrone are useful as laxatives.

This invention relates to biologically active anthrone derivatives, which are obtained from rheinanthrone such as the lithium rheinanthrone complex salt, in which one atom of lithium forms a salt with the carboxyl group of anthrone and another atom of lithium forms a complex with the keto and phenolic groups of the anthrone nucleus, and the normal lithium salt of rheinanthrone, methods for their preparation, and pharmaceutical dosage forms whereby these new compounds may be employed in therapy.

Chronic constipation is a problem which is met very frequently in the every-day practice of medicine and is one which causes great distress to the sufferers. It may result from a variety of organic lesions, as for example, hypothyroidism, benign or malignant obstructive lesions, and megacolon. There is also a much larger group of patients who suffer from constipation without apparent causative organic lesions. A number of factors may lead to the development of this type of constipation, among which are included faulty bowel habits; special diets which are concentrated and possess little bulk; the too rapid absorption of fluids from the colon resulting in undue desiccation of the fecal contents; psychic factors and either hypertonic or hypotonic states of the colon.

The treatment of constipation resulting from such non-organic causes is essentially dependent upon the administration of cathartic drugs to cause an evacuation of the colon. This may be achieved through different pharmacodynamic pathways, ranging from a direct stimulatory action to the colon to the liquefaction of the fecal mass. Since it has been estimated that about one-half the patients suffering from digestive tract disorders complain of constipation, the therapeutic need for reliable, non-toxic, pharmacologically active agents, which are useful to correct constipation, is readily apparent.

The use of laxatives to facilitate the passage and elimination of feces from the colon and rectum, dates back to ancient times. Among the many natural botanical products used for this purpose, the plants containing anthracene derivatives have received the greatest therapeutic attention. Thus, cascara, senna, rhubarb and aloes plants have been used for centuries in various dosage forms for their therapeutic benefit as constipation correctives. However, these natural plants substances have certain inherent limitations which have presented problems to the clinician and the patient. The prolonged ingestion of cascara sagrada, obtained from *Rhamnus pershiana*, frequently results in a characteristic, melanotic pigmentation of the rectal mucosa. Senna preparations which are derived from the leaves of *Cassia acutifolia or angustifolia* are more potent than cascara but may produce considerable abdominal cramping distress, which probably results from the wide variation in concentration of the active substances found in the growing leaf of the senna plant as well as the variation observed in the extraction procedures utilized. Furthermore, the active substances of senna have been shown to be unstable under certain conditions which results in increased variation of therapeutic response. Rhubarb, because of the wide variation in the observed response has generally been found to be ineffective for long term therapy. Aloin the active principle of aloes, is an irritating glycoside which causes severe abdominal cramps and pelvic vascular congestion. The ingestion of large quantities of aloes has been reported to be injurious to the kidneys.

Of this group of botanical cathartic plants, the senna plant has been found to be the most useful. The laxative activity of senna is attributable to anthracene glycosides which, when taken orally are absorbed into the blood stream. A metabolite is excreted into the colon and causes peristalsis. This train of events takes about 8 hours from the time of ingestion of the medication. The problem of abdominal distress resulting from variations in potency of preparations of senna leaves has been largely eliminated through the use of concentrates prepared from selected parts of the senna plant, as for example, the senna pod, and which are standardized to achieve a uniform potency.

In certain post-operative states as well as in other pathologic conditions, it is frequently considered desirable to achieve a more rapid bowel evacuation than would result after the oral route of administration. However, when the conventional senna anthracene glycosides are utilized by the rectal route, the necessary active metabolites are not rapidly liberated to achieve the desired immediate peristaltic response. The object of the present invention is to produce, from rheinanthrone obtainable from senna anthracene glycosides or other suitable anthracene substances, an agent which will bring about the desired laxative activity through a direct contact with the colon or the rectum and will have chemical stability so that it may be incorporated into solid or liquid pharmaceutical dosage forms for therapeutic use.

This object is achieved, according to the present invention, by producing compounds of lithium and rheinanthrone. Two compounds are obtained, one of which may be called lithium rheinanthrone complex salt, in which one atom of lithium forms a salt with the carboxyl group of rheinanthrone while another atom of lithium forms a complex with a keto and phenolo groups of the anthrone nucleus, and the other is the normal salt of lithium and rheinanthrone. These new compounds are obtained by reacting rheinanthrone with lithium hydroxide solution until the pH is about 7.0, when the complex salt is desired, or to pH 5.4 when the normal salt is prepared, and evaporating the reacting medium to dryness.

Rheinanthrone is a well known chemical compound having the following formula:

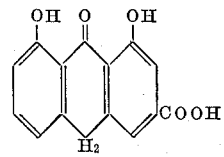

and is obtainable by hydrolysis and reduction of an extract of the senna plant containing anthracene glycosides or may be prepared synthetically from anthracene. Rheinanthrone is a pale yellow microcrystalline substance, decomposing at 250° to 280.° C.

When lithium hydroxide reacts with rheinanthrone in a neutral, inert medium, the compound obtained depends upon the synthetic conditions employed. The complex salt of lithium rheinanthrone results when three equivalents of lithium are reacted with two equivalents of rheinanthrone. The proposed structure for this compound is:

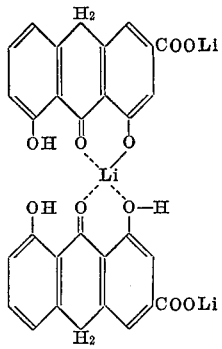

This compound has the empirical formula $C_{30}H_{17}O_{10}Li_3$ and the molecular weight of 558. A 5 percent aqueous solution has a pH of 7.2 and is very soluble in water, ethyl acetate and butanol. The compound has a characteristic ultra-violet spectrum (see FIG. 1), with the following ultra-violet absorption characteristics:

U.V. ABSORPTION CHARACTERISTICS OF LITHIUM RHEINANTHRONE COMPLEX SALT

| $\lambda^{max.}_{mu}$ | $E^{1\%}_{1cm.}$ |
|---|---|
| 270 | 425 |
| 295 | 297 |
| 373.5 | 326 |

The normal salt, lithium rheinanthrone, is obtained when one equivalent of lithium is caused to react with one equivalent of rheinanthrone and has the following structure:

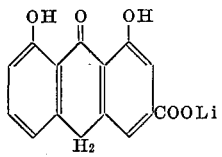

The empirical formula for this compound is $C_{15}H_9O_5Li$, with a molecular weight of 276. The compound produces a characteristic ultra-violet absorption spectrum (see FIG. 2) and has the following ultra-violet absorption characteristics:

U.V. ABSORPTION CHARACTERISTICS OF LITHIUM RHEINANTHRONE NORMAL SALT

| $\lambda^{max.}_{mu}$ | $E^{1\%}_{1cm.}$ |
|---|---|
| 269 | 493.5 |
| 295 | 375 |
| 371 | 361 |

Both the complex salt and the normal salt of lithium rheinanthrone yield an intense green color, characteristic of the rheinanthrone moiety when reacted with p-nitrosodimethylaniline in pyridine solution, as well as the characteristic crimson-red flame test reaction for lithium.

When these compounds are prepared synthetically it is preferred that an inert medium be used, as for example, aqueous or hydroalcoholic solvents. The respective compounds are readily obtained through appropriate adjustment of reacting proportions of reagents. When the lithium rheinanthrone complex salt is desired, the reaction is continued until the pH of the reaction medium is about pH 7 and when the normal salt is desired, the terminal pH of the reacting mixture is pH 5.4. When the reaction has been completed, the solvent is rapidly evaporated to dryness under reduced pressure, by spray-drying or by spreading it in thin layers on trays in a low humidity room. It is not necessary for the purposes of further pharmaceutical formulation to purify the compounds resulting from the synthetic reaction, if care has been exercised to avoid significant excesses of reagents. The crude lithium rheinanthrone complex salt as well as the crude lithium rheinanthrone normal salt is biologically active and has excellent stability. It is this high degree of stability which distinguishes the lithium rheinanthrone complex salt and the lithium rheinanthrone normal salt from certain other rheinanthrone salts.

A solution of the lithium rheinanthrone complex salt or of the normal salt of lithium rheinanthrone, in Tyrode's solution ($10^{-5}$ to $10^{-3}$ gms./ml.) rapidly induces a propulsive peristaltic activity when applied either to the mucosal or serosal surface of a length of guinea pig colon or guinea pig rectum mounted in a Trendelenburg apparatus. Both the circular and longitudinal muscle coats of the intestine are stimulated and the nature of the propulsive activity has been shown by means of a Bulbring type apparatus, to be similar in character and intensity to the normal peristaltic waves.

Both of the new compounds have a relatively low order of toxicity and may be used in therapy to induce bowel evacuation. This may be achieved by the administration of either the lithium rheinanthrone complex salt or the lithium rheinanthrone normal salt, in a unit dosage range of from 5 mg. to 80 mg. of the respective active compound. The vehicle for the active ingredient may be either water, normal saline solution, glycerin, propylene glycol, ethanol or mixtures of these when liquid preparations are desired. When solid dosage forms are indicated, the active ingredients are mixed with a suitable solid pharmaceutcal carrier, as for example, starch, sucrose, talc, cocoa butter, hydrogenated vegetable fat, solid polyoxyethylene glycols having a molecular weight of from 1500 to 6000, or mixtures of these and subdivided into suitable unit dosage forms, so that each unit dose contains a range of from 5 mg. to 80 mg. of the active compound.

A preferred method of administration of the lithium rheinanthrone complex salt and lithium rheinanthrone normal salt is by the rectal route through the use of either a suppository or an enema. The suppository dose form is prepared by dispersing the lithium rheinanthrone complex salt or the lithium rheinanthrone normal salt, in a pharmaceutically acceptable suppository base as for example, cocoa butter, hydrogenated vegetable fat, solid polyoxyethylene glycols having a molecular weight of from 1500 to 6000, or mixtures of these and then subdividing and shaping the mixture into suitable suppositories so that each suppository contains from 5 mg. to 80 mg. of the respective active compound selected.

When the enema is desired, then a solution of lithium rheinanthrone complex salt or lithium rheinanthrone normal salt is prepared by dissolving from 5 mg. to 80 mg. of the selected compound in one pint of a vehicle consisting of water or normal saline solution or 10 percent glycerine-water mixture, or 10 percent propyleneglycol-water mixture, or mixture of these. The enema solution is then introduced into the rectum whereupon bowel evacuation follows within a relatively short period of time.

In a series of clinical trials carried out in 22 separate hospital wards, among 2nd day postpartum and female geriatric patients, involving a total of 878 patients, a suppository containing lithium rheinanthrone was shown to have a high degree of laxative activity. The response rate for a suppository containing 30 mg. of lithium rheinanthrone was 81.5 percent, whereas that of a control suppository consisting only of the suppository base, was 16.8 percent. These differences were statistically analyzed and found to be highly significant (P less than 0.001). The incidence of side effects attributable to lithium rheinanthrone was negligible. The clinical trial was carried out under strict double blind conditions and a restricted, sequential analysis formed the basis of the statistical evaluation of the results.

In another group of clinical studies carried out in 14 hospital wards and involving 200 patients, a success rate of 85 percent was reported for the lithium rheinanthrone suppository and the observable side effects were negligible.

The following examples illustrate the scope of the present invention:

EXAMPLE 1

In a glass boiling flask, fitted with a stirring device, is placed one part by weight of powdered rheinanthrone and to this is added 3 to 10 parts by weight of water. The mixture is stirred until the rheinanthrone is uniformly suspended and then a 10 percent aqueous solution of lithium hydroxide is added drop-wise, with stirring, until the pH of the mixture is pH 7. The weight of lithium hydroxide required to achieve this neutral pH is about 0.1 part by weight of the weight of powdered rheinanthrone utilized. The mixture is stirred at room temperature until complete solution is achieved. The solution is then filtered and the solvent evaporated to dryness under reduced pressure, or by spray-drying, or by spreading it in thin layers on trays in a low humidity room. The compound thus obtained is lithium rheinanthrone complex salt, in which one atom of lithium forms a salt with the carboxyl group of rheinanthrone and another atom of lithium forms a complex with the keto and phenolic groups of the anthrone nucleus. The compound has an empiric formula of $C_{30}H_{17}O_{10}Li_3$ and a molecular weight of 558. It analyzes in good agreement with the theoretical elemental values: C—64.5 percent; H—3.04 percent; Li—3.75 percent, and has the following structure:

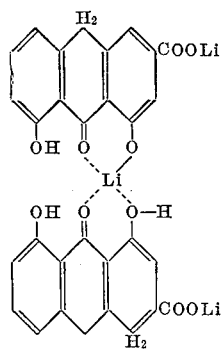

Lithium rheinanthrone complex salt is very soluble in water, ethyl acetate and butanol. A 5 percent aqueous solution has a pH of 7.2. The compound has a characteristic ultra-violet absorption spectrum (see FIG. 1) and the ultra-violet absorption characteristics of this compound are:

U.V. ABSORPTION CHARACTERISTICS OF LITHIUM RHEINANTHRONE COMPLEX SALT

| $\lambda_{m\mu}^{max.}$ | $E_{1\ cm.}^{1\%}$ |
|---|---|
| 270 | 425 |
| 295 | 297 |
| 373.5 | 326 |

Lithium rheinanthrone complex salt yields a characteristic crimson-red flame test reaction for lithium and an intense green color forms in the presence of p-nitroso-dimethylaniline in pyridine.

EXAMPLE 2

Lithium rheinanthrone normal salt is prepared by titrating one gram-molecular equivalent of rheinanthrone with a gram-molecular equivalent of lithium hydroxide. The reaction is a direct neutralization reaction and the pH break-point is pH 5.2. The titration is carried out in a glass vessel. A suspension of 0.1 gram mol of rheinanthrone is suspended in 0.1 liter of water and to this is added, in drop-wise manner, a 10% aqueous solution of lithium hydroxide. About 0.07 part by weight, of lithium hydroxide is required for each part by weight, of rheinanthrone. The suspension of rheinanthrone is stirred during the titration and the pH taken periodically. When a gram-molecular equivalent of lithium hydroxide has been introduced into the reaction mixture, the pH of the solution is about pH 5.2–pH 5.4. The mixture is stirred for a few minutes and filtered and the solvent evaporated to dryness. The resulting compound is the normal salt of lithium rheinanthrone, having the following structural formula:

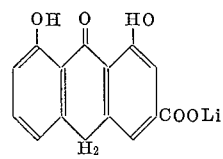

The molecular weight is 276. The compound has the empiric formula $C_{15}H_9O_5Li$ and analyzes in good agreement with its theoretical values: C—65.2 percent; H—3.3 percent; Li—2.5 percent. Lithium rheinanthrone normal salt is very soluble in water, ethyl acetate and butanol and a 5 percent aqueous solution has a pH of 5.4. The ultra-violet absorption characteristics of lithium rheinanthrone normal salt (see FIG. 2) are as follows:

U.V. ABSORPTION CHARACTERISTICS OF LITHIUM RHEINANTHRONE NORMAL SALT

| $\lambda_{m\mu}^{max.}$ | $E_{1\ cm}^{1\%}$ |
|---|---|
| 269 | 493.5 |
| 295 | 375 |
| 371 | 361 |

Lithium rheinanthrone normal salt yields a characteristic crimson-red flame test reaction for lithium and an intense green color forms in the presence of p-nitroso-dimethylaniline in pyridine.

EXAMPLE 3

In place of the rheinanthrone described in Examples 1 and 2 above, there may be substituted in stoichiometric equivalent amounts, concentrates of rheinanthrone prepared from senna extracts. Such concentrates may be prepared by extracting one part, by weight, of powdered Alexandrian senna, with six parts, by volume of 70 percent ethanol containing 2 percent sulfuric acid. The alcohol-acid extract is neutralized and the solvent evaporated. The residue is suspended in water, hydrolyzed and reduced, so that it contains rheinanthrone. Other solvents, such as water and 70 percent acetone, may also be used to extract the senna plant. After hydrolysis and reduction, the rheinanthrone content of the concentrate may be determined by optical techniques and then reacted with the necessary stoichiometric equivalent of lithium hydroxide to produce either the complex salt, if the procedure of Example 1 is followed, or the normal salt, if the procedure of Example 2 is followed.

EXAMPLE 4

In order to achieve pharmacological effect of peristaltic stimulation, lithium rheinanthrone complex salt may be introduced into the rectum, either as a solid or liquid dosage form. The effect of lithium rheinanthrone complex salt on the peristaltic activity of the colon is rapid and without side reactions or gastrointestinal distress.

The stimulation of peristaltic activity may be readily observed thru the use of a laboratory preparation of the colon and rectum which is set up in the Tyrode bath of the Bulbring apparatus, utilizing the modifications shown in FIG. 3. Through the use of this procedure, there is no need to pierce the colon in order to measure peristaltic motion, since the movement in the colon forces liquid up through the tube into a volume receiver. The rectum of the preparation is filled with active substances through an inner tube by means of a hypodermic syringe.

In carrying out this test, the level of the Tyrode solution connected to the rectum is adjusted to a height of 10 cm. above the level of Tyrode solution introduced into rectum. This level is marked on a tube leading out of the rectum and is found to be unchanged after 15 minutes, indicating that there was no leakage past the Bakelite plug. A solution of fluorescein in introduced into the rectum and the Tyrode solution in the colon is examined for fluorescence with a spectrophotometer to confirm that there is no leakage past the Bakelite plug barrier. The exit level of the Tyrode solution from the colon is kept about 1 cm. higher than the exit level from the rectum, thus insuring that throughout the experiment the pressure gradient is from the colon to the rectum. This limits any possible flow of solution from the rectum into the colon.

A solution containing $10^{-5}$ gm./ml. of lithium rheinanthrone complex salt is introduced into the rectum. Peristalsis of the colon begins within one minute and continues throughout the period of observation—110 minutes. The average rate of propulsion is about 2 ml. of Tyrode solution, every 5 minutes. Volume changes in the rectum begin within one minute and while being very small at first, become marked after 15 minutes and continue undiminished until the end of the experiment. In this way, it can be readily observed that the effect of lithium rheinanthrone complex salt is rapid and sustained in connection with the initiation and maintenance of peristaltic activity. In place of the lithium rheinanthrone complex salt there may be substituted in the same concentration a solution of lithium rheinanthrone normal salt and the results will be substantially the same.

EXAMPLE 5

When it is desired to utilize lithium rheinanthrone complex salt or lithium rheinanthrone normal salt in therapy, as a solid pharmaceutically acceptable dosage form, then these may be formulated as follows:

A mixture of 90 parts of the selected lithium rheinanthrone compound is prepared with 90 to 900 parts of a diluent such as starch. Pharmaceutically acceptable binding agents, such as acacia, 5 to 50 parts, may be added if desired. The mixture is wetted with water, 15 to 150 parts and granulated through a No. 12 mesh sieve. After drying the granules are shaped into suitable solid dosage forms such as for example a tablet so that each unit dose contains from 5 mg. to 80 mg. of the active compound per unit dose, with a preferred concentration of 30 mg. per unit dose. The solid dosage forms may be enteric coated if desired.

EXAMPLE 6

When a liquid dose form is desired, then either lithium rheinanthrone complex salt or lithium rheinanthrone normal salt is dissolved in an inert, pharmaceutically acceptable carrier, such as water, normal saline solution, 10 percent glycerin-water mixture or 10 percent propylene glycol-water mixture, in proportion of from 0.5 to 10 parts by weight of active compound for each 10 to 500 parts by weight of carrier. The solution is then subdivided into convenient dispensing volumes so that each unit dose contains from 5 mg. to 80 mg. of the active compound per unit dose. The unit dose volume may be as low as 1/3 cc. and as high as 456 cc. (one pint). A preferred quantity of the active ingredient in each unit dose is 30 mg. of substances.

EXAMPLE 7

To make a suppository of lithium rheinanthrone complex salt or the lithium rheinanthrone normal salt, 7.5 parts by weight of the respective active substance is mixed with 156 parts by weight of cocoa butter, which had previously been melted at a temperature not exceeding 40° C. The liquid mixture is passed through a homogenizer and cooled to about 34° C. The liquid mixture is then poured into a suitable suppository mold having a capacity of about 1.65 gm. The filled suppository mold is set aside to cool in a chilled room, after which the suppositories are extruded and are suitable for use in therapy.

EXAMPLE 8

When it is desired to achieve a laxative effect, then the suppository dose form or the enema may be used. The rectal insertion of a suppository containing from 5 mg. to 80 mg. of the active compound will produce a prompt and effective bowel evacuation even in the presence of stubborn constipation. The preferred dosage is 30 mg. per suppository although some patients will require greater amounts and others a lesser amount of active ingredient. While one suppository will be found to be effective in the vast majority of patients, it may be found necessary to utilize more than one suppository on occasion.

The enema is administered by the rectal route so that between 5 mg. and 80 mg. of the active ingredient is administered per unit dose with a preferred quantity or active ingredient being 30 mg. per unit dose. The volume of the enema dose form to be used in therapy may range as low as 50 cc. and as high as 456 cc., one pint. A preferred enema solution contains 30 mg. of lithium rheinanthrone complex salt dissolved in 250 cc. of normal saline solution. Because of the rapid induction of bowel activity, the suppository and enema preparations may be used at any time when indicated.

In the claims, when the term "lithium rheinanthrone" is used, it is understood to refer to the lithium rheinanthrone normal salt.

What we claim is:

1. A compound of the structure:

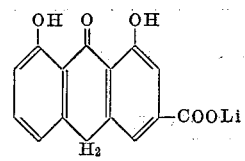

2. A compound of the structure:

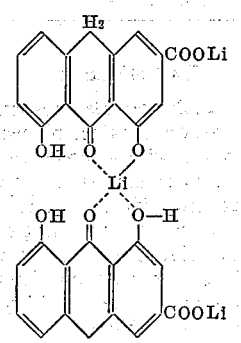

References Cited

UNITED STATES PATENTS

| | | | |
|---|---|---|---|
| 2,385,185 | 9/1945 | Batty | 260—351 |
| 2,544,825 | 3/1951 | Coffey | 260—351 |
| 2,870,061 | 1/1959 | Huggins | 167—56 |
| 2,871,157 | 1/1959 | Cardaciotto | 167—56 |

FOREIGN PATENTS 832,017   4/1960   Great Britain.

OTHER REFERENCES

Hörhammer et al., Arch. Pharm. vol. 292, pp. 591–601 (1959) [reported in Chemical Abstracts, vol. 54, column 1207h (1960)].

Wagner et al., Die Naturwissenschaften, vol. 44, pp. 260–261 (1957).

Stoll et al.: Helvitica Chimica Acta, vol. 32, Basel, Switzerland: E. Birchhaeuser & Co., So, pp. 1892–1903 (1949).

Ferguson: J. Am. Pharm. Assoc. vol. XLV, pp. 650–653, (1956). (Group 120 Medical library).

Soines et al.: Rogers' Inorganic Pharmaceutical Chemistry. London, Henry Kingston pp. 188–189 (1957).

JAMES A. PATTEN, Primary Examiner

E. J. SKELLY, Assistant Examiner

U.S. Cl. X.R.

424—317